United States Patent
Schwarz et al.

(10) Patent No.: US 10,865,359 B2
(45) Date of Patent: *Dec. 15, 2020

(54) LUBRICATING OIL COMPOSITIONS

(71) Applicant: Infineum International Limited, Abingdon (GB)

(72) Inventors: Andrew D. Schwarz, Abingdon (GB); Manuel Hartweg, Cambridge, MA (US); Beatrice Cattoz, Bristol (GB); Daniel J. Phillips, Southam (GB); Anthony J. Strong, Oxford (GB); Remzi Becer, Rugby (GB)

(73) Assignee: Infineum International Limited

( * ) Notice: Subject to any disclaimer, the term of this patent is extended or adjusted under 35 U.S.C. 154(b) by 0 days.

This patent is subject to a terminal disclaimer.

(21) Appl. No.: 16/201,009

(22) Filed: Nov. 27, 2018

(65) Prior Publication Data

US 2019/0161696 A1 May 30, 2019

(30) Foreign Application Priority Data

Nov. 29, 2017 (EP) .................................. 17204463

(51) Int. Cl.
| | | |
|---|---|---|
| *C10M 149/12* | (2006.01) | |
| *C08G 73/02* | (2006.01) | |
| *C10M 169/04* | (2006.01) | |
| *C10N 20/04* | (2006.01) | |
| *C10N 20/00* | (2006.01) | |
| *C10N 30/02* | (2006.01) | |
| *C10N 30/06* | (2006.01) | |
| *C10N 30/00* | (2006.01) | |
| *C10N 40/10* | (2006.01) | |
| *C10N 40/25* | (2006.01) | |

(52) U.S. Cl.
CPC ....... *C10M 149/12* (2013.01); *C08G 73/0233* (2013.01); *C10M 169/041* (2013.01); *C10M 2203/1006* (2013.01); *C10M 2203/1025* (2013.01); *C10M 2205/003* (2013.01); *C10M 2217/044* (2013.01); *C10M 2217/046* (2013.01); *C10M 2223/00* (2013.01); *C10N 2020/04* (2013.01); *C10N 2020/067* (2020.05); *C10N 2020/073* (2020.05); *C10N 2030/02* (2013.01); *C10N 2030/06* (2013.01); *C10N 2030/68* (2020.05); *C10N 2040/10* (2013.01); *C10N 2040/25* (2013.01)

(58) Field of Classification Search
CPC ............ C10M 149/12; C10M 169/041; C10M 2203/1006; C10M 2203/1025; C10M 2217/044; C10M 2217/046; C10M 2223/00; C10N 2020/04; C10N 2020/067; C10N 2020/073; C10N 2030/02; C10N 2030/06; C10N 2030/68; C10N 2040/10; C10N 2040/25; C08G 73/0233
See application file for complete search history.

(56) References Cited

U.S. PATENT DOCUMENTS

| | | | | |
|---|---|---|---|---|
| 4,120,804 A | * | 10/1978 | Smith ................... | C10L 1/2383 508/548 |
| 5,786,308 A | * | 7/1998 | Eicken .................. | C09D 5/037 525/410 |
| 10,407,639 B2 | * | 9/2019 | Schwarz ................ | C08G 69/00 |
| 2007/0111895 A1 | * | 5/2007 | Bell ......................... | C09K 8/82 507/130 |
| 2014/0011964 A1 | * | 1/2014 | Harris ..................... | C07K 7/08 525/417 |

FOREIGN PATENT DOCUMENTS

| | | | |
|---|---|---|---|
| EP | 3257921 A1 | | 12/2017 |
| JP | 2003261678 A | * | 9/2003 |
| JP | 2003261678 A | | 9/2003 |

OTHER PUBLICATIONS

M. Beck et al., Polyoxazoline aug fettchemischer Basis. 2373 Angewandie Makromoledulare Chemie, Applied Macromolecular Chemistry and Physics, 223Dec. 1994, Zug, CH, pp. 217-233 (4018), 1994 Huthig & Wepf Verlag, Zug.

* cited by examiner

*Primary Examiner* — James C Goloboy

(57) ABSTRACT

A lubricating composition comprises a major amount of an oil of lubricating viscosity and 0.01 to 25 percent by weight, based on the weight of the composition, of a poly(2-oxazoline) polymer. The polymer has the repeat unit:

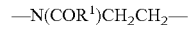

—N(COR$^1$)CH$_2$CH$_2$— wherein the number of repeat units (n) in the polymer is an integer between 4 and 1000, such as between 4 and 500. The polymer carries an inorganic or organic nucleophilic polymerisation terminating group (t), and an initiator group (i) connected to the N atom of a repeat unit, the initiator group (i) being effective to initiate the polymerisation of linear, branched or cyclic hydrocarbyl moieties. At least 5% of the total number of the groups R$^1$ in the polymer comprise alkenyl groups having between 15 and 20 carbon atoms.

12 Claims, No Drawings

LUBRICATING OIL COMPOSITIONS

FIELD OF THE INVENTION

This invention relates to lubricating oil compositions (lubricants) containing polymeric additives for lubricating the crankcase of spark-ignited or compression-ignited internal combustion engines. More especially, the additives are specific poly(2-oxazoline)s that provide friction modifier properties to lubricating oils while also having a surprisingly low impact on lubricant viscosity.

BACKGROUND OF THE INVENTION

There is much interest in improving the fuel economy of gasoline and diesel engines. This can be done, through the lubricant engine oil, by reducing the friction contribution either of the bulk fluid (by lowering the oil viscosity) or improving the friction of the contacting parts by inclusion of friction modifier additives.

There is therefore interest in additives with low friction properties in low viscosity oils.

Dispersant viscosity modifier (DVM) additives are known to provide friction modification. Examples known in the art, based on polymer technology, are olefin copolymers (OCP) and methacrylate copolymers. A problem with such additives especially in applications which require ultra-low viscosity lubricating fluids such as 0W-8, 0W-16, 0W-20 is their high thickening efficiencies.

Poly(2-oxazoline)s are known in the art. For example, the art describes the living cationic ring-opening polymerization of 2-oxazolines, see Hoogenboom et al., Angew. Chem. Int. Ed 2009, 48, 7978-7994. U.S. Pat. No. 4,120,804 describes the use of short oligomers of poly(2-oxazoline)s (number of repeating units (n)=2-15) as a dispersant to prevent or reduce the formation of sludges, or to neutralise acidic components etc. in lubricating oils. The polymerisation initiator is a polymeric material of molecular weight equal to or greater than 250 and the oxazoline is 2-substituted with a hydrocarbyl group of 1-18 carbon atoms. No mention is made of friction modification, or of lubricant viscosity impact.

SUMMARY OF THE INVENTION

In a first aspect, the invention provides a lubricating composition comprising a major amount of an oil of lubricating viscosity and 0.01 to 25 percent by weight, based on the weight of the composition, of a poly(2-oxazoline) polymer having the repeat unit:

—N(COR$^1$)CH$_2$CH$_2$— wherein the number of repeat units (n) in the polymer is an integer between 4 and 1000, such as between 4 and 500;

wherein the polymer carries an inorganic or organic nucleophilic polymerisation terminating group (t), and an initiator group (i) connected to the N atom of a repeat unit, the initiator group (i) being effective to initiate the polymerisation of linear, branched or cyclic hydrocarbyl moieties; and wherein at least 5% of the total number of the groups R$^1$ in the polymer comprise alkenyl groups having between 15 and 20 carbon atoms.

In a second aspect, the invention provides a method of lubricating the crankcase of an internal combustion engine comprising operating the engine and lubricating the crankcase with a lubricating composition of the first aspect of the invention in the form of a crankcase lubricant.

In a third aspect, the invention provides the use of a polymer additive comprising a poly(2-oxazoline) polymer having the repeat unit:

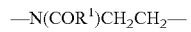
—N(COR$^1$)CH$_2$CH$_2$— wherein the number of repeat units (n) in the polymer is an integer between 4 and 1000, such as between 4 and 500;

wherein the polymer carries an inorganic or organic nucleophilic polymerisation terminating group (t), and an initiator group (i) effective to initiate the polymerisation of linear, branched or cyclic hydrocarbyl moieties; and wherein at least 5% of the total number of the groups R$^1$ in the polymer comprise alkenyl groups having between 15 and 20 carbon atoms, in a lubricant for an internal combustion engine to provide the lubricant, in operation of the engine, with friction reducing properties.

The poly(2-oxazoline)s of the invention may be made by living cationic ring-opening polymerization of 2-oxazolines and may be made in the form of homopolymers, star polymers or copolymers.

A general process for making said homopolymers and star polymers comprises polymerizing a 2-substituted oxazoline with an initiator for providing one polymeric limb (as in a homopolymer) or for providing a plurality (e.g. four) polymeric limbs from a central source (as in a star polymer).

A general process for making said block copolymers comprises polymerising a first 2-substituted-2-oxazoline monomer with an initiator to make a first polymeric block and then polymerising with a second 2-substituted-2-oxazoline monomer to make a second polymeric block. Further blocks may be provided if required.

Examples of these processes will be provided in this specification.

DETAILED DESCRIPTION OF THE INVENTION

Definitions

In this specification, the following words and expressions, if and when used, have the meaning given below:

"active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof. The expressions "consists of" or "consists essentially of" or cognates may be embraced within "comprises" or any cognate word. The expression "consists essentially of" permits inclusion of substances not materially affecting the characteristics of the composition to which it applies. The expression "consists of" or cognates means only the stated features, steps, integers components or groups thereof are present to which the expression refers;

"oil-soluble" or "oil-dispersible", or cognate terms, used herein do not necessarily indicate that the compounds or additives are soluble, dissolvable, miscible, or are capable of being suspended in the oil in all proportions. These do mean, however, that they are, for example, soluble or stably dispersible in oil to an extent sufficient to exert their intended effect in the environment in which the oil is employed. Moreover, the additional incorporation of other additives may also permit incorporation of higher levels of a particular additive, if desired;

"ashless" in relation to an additive means the additive does not include a metal;

"ash-containing" in relation to an additive means the additive includes a metal;

"major amount" means in excess of 50 mass % of a composition or mixture;

"minor amount" means 50 mass % or less of a composition or mixture;

"effective amount" in respect of an additive means an amount of such an additive in the composition (e.g. an additive concentrate) that is effective to provide, and provides, the desired technical effect;

"ppm" means parts per million by mass, based on the total mass of the composition;

"metal content" of a composition or of an additive component, for example molybdenum content or total metal content of the additive concentrate (i.e. the sum of all individual metal contents), is measured by ASTM D5185;

"TBN" in relation to an additive component or of a composition, means total base number (mg KOH/g) as measured by ASTM D2896;

"$KV_{100}$" means kinematic viscosity at 100° C. as measured by ASTM D445;

HTHS means High Temperature High Shear at 150° C. as measured by—CEC-L-36-A-90.

"phosphorus content" is measured by ASTM D5185;

"sulfur content" is measured by ASTM D2622;

"sulfated ash content" is measured by ASTM D874;

$M_n$ means number average molecular weight as measured by Gel Permeation Chromatography with reference to linear narrow poly(methylmethacrylate) standards in the range of 550 to 600,000 g/mol;

$M_w$ means weight average molecular weight as measured by Gel Permeation Chromatography with reference to linear narrow poly(methylmethacrylate) standards in the range of 550 to 600,000 g/mol;

"dispersity" means $M_w/M_n$, (denoted by Đ)

Also it will be understood that various components used, essential as well as optimal and customary, may react under condition of formulation, storage and use and that the invention also provides the product(s) obtainable or obtained by any such reaction.

Further it is understood that any upper and lower quality, range or ratio limits set forth herein may be independently combined.

Poly(2-Oxazoline)s

The poly(2-oxazoline)s of the invention may be homopolymers, i.e. polymers that contain only one type of repeat unit, or they may be copolymers, i.e. polymers derived from more than one species of monomer.

As examples of copolymers there may be mentioned statistical copolymers which are formed where the polymerisation follows a known statistical rule, for example Bernouillian statistics or Markovian statistics. A statistical polymer where the probability of finding a particular type of monomer residue at any particular point in the polymer chain is independent of the types of surrounding monomers can be referred to as a random copolymer. Statistical and random copolymers may be distinguished from more ordered polymer types such as alternating copolymers, periodic copolymers and block copolymers.

Block copolymers, i.e. in which two or more polymers (e.g. homopolymers) sub-units are linked by covalent bonds (e.g. as di- or tri-blocks), are noteworthy in the context of this invention.

Also noteworthy are branched and hyperbranched polymers, in particular star polymers where several (three or more) linear polymer chains (or "arms") are covalently bonded to a central core.

Poly(2-oxazoline)s and their preparation have been discussed in the "Background of the Invention" above. In their preparation, any cationic species is capable of initiating polymerization of 2-oxazolines. Examples include $H^+$ (from HCl or other acids); $R^+$ (for example from alkyl halides such as RI or RBr); and metal cations and salts (e.g. $Zr^{4+}$). Any nucleophilic species is capable of terminating the polymerization (eg $OH^-$ from atmospheric water, $OTs^-$ (tosylate), $H_2NR$, HSR). Other suitable initiator groups (i) and terminating groups (t) will be known to those skilled in the art.

Preferred initiator groups (i) include $H^+$; cationic alkyl radicals such as $Me^+$, $propyl^+$ and higher analogues; cationic alkenyl radicals such as $propenyl^+$ and higher analogues; cationic alkylenyl radicals such as $propargyl^+$ and higher analogues; metal cations and other inorganic cations. Particularly preferred as initiator group (i) are cationic alkyl alkenyl or alkylenyl radicals, especially $Me^+$.

Preferred terminating groups (t) include $OTs^-$ (tosylate) and $OH^-$.

In a particularly preferred embodiment, the poly(2-oxazolines) are prepared in the presence of methyl tosylate or propargyl tosylate such that the initiator group (i) and the terminating group (t) are provided from the same molecule.

Preferably, n is between 4 and 400, preferably 10 and 400, more preferably 10 and 300, for example 25 to 300.

Generally, higher degrees of polymerization are preferred, though 500 may be a preferred upper limit for n. Also, the presence of hetero atoms (such as N, O, S, P, B, Si, F, Cl, Br, I) in $R^1$ may be preferred. As discussed hereinabove, the term 'hydrocarbyl' when applied to $R^1$ permits the presence of a limited number of hetero atoms and so is not limited to groups which contain carbon and hydrogen only.

When a star architecture is required, the polymeric material may be prepared by a) use of a multifunctional initiator; b) cross linking; or c) use of a multifunctional terminator or coupling.

In an embodiment, the polymer has a star architecture with three or more arms, and a molecular weight of 10,000-500,000 g/mol.

In this specification, molecular weight is as measured by Gel Permeation Chromatography with reference to linear narrow poly(methylmethacrylate) standards in the range of 550 to 600,000 g/mol.

Preferably, at least 10% of the total number of the groups $R^1$ in the polymer comprise alkenyl groups having between 15 and 20 carbon atoms. More preferably, at least 20% or 30% or 40% or 50% of the total number of the groups $R^1$ in the polymer comprise alkenyl groups having between 15 and 20 carbon atoms. Most preferably, at least 60% or 70% of the total number of the groups $R^1$ in the polymer comprise alkenyl groups having between 15 and 20 carbon atoms.

Preferably, at least 5% of the total number of the groups $R^1$ in the polymer comprise alkenyl groups having 17 carbon atoms. More preferably, at least 10% or 20% or 30% or 40% or 50% or 60% of the total number of the groups $R^1$ in the polymer comprise alkenyl groups having 17 carbon atoms. Even more preferably, at least 70% of the total number of the groups $R^1$ in the polymer comprise alkenyl groups having 17 carbon atoms.

In preferred embodiments, at least 50% of the total number of the groups $R^1$ in the polymer comprise singly, doubly or triply-unsaturated $C_{17}$ alkenyl groups or any mixture thereof. More preferably, at least 60% of the total number of the groups $R^1$ in the polymer comprise singly, doubly or triply-unsaturated $C_{17}$ alkenyl groups or any mixture thereof. Even more preferably, at least 70% of the total number of the groups $R^1$ in the polymer comprise singly, doubly or triply-unsaturated $C_{17}$ alkenyl groups or any mixture thereof.

In particularly preferred embodiments, groups $R^1$ comprise a mixture of singly, doubly or triply-unsaturated $C_{17}$ alkenyl groups which mixture predominates in singly, and doubly-unsaturated $C_{17}$ alkenyl groups. Such mixtures may comprise small amounts of smaller and longer molecules.

Suitable sources for mixtures of groups $R^1$ include natural fatty acids such as tall oil fatty acid (TOFA) and rape-seed oil fatty acid. Other suitable sources will be known to those skilled in the art.

Lubricating Oil Compositions

Lubricating oil compositions of the invention may be lubricants suitable for use as motor vehicle motor oils comprising a major amount of oil of lubricating viscosity and minor amounts of performance-enhancing additives, including the polymer. The lubricating composition may also be in the form of an additive concentrate for blending with oil of lubricating viscosity to make a final lubricant.

The lubricating oil compositions of the invention will contain 0.01 to 25 percent by weight, based on the weight of the composition of the oil-soluble poly(2-oxazoline) polymer, more preferably 0.01 to 10, for example up to 0.5, 1, 2, 3, 4 or 5 percent by weight, based on the weight of the composition. When in the form of an additive concentrate, typically the oil-soluble poly(2-oxazoline) polymer will be present in an oil of lubricating viscosity in an amount of 30 to 50 percent by weight, based on the weight of the composition.

The oil of lubricating viscosity (sometimes referred to as "base stock" or "base oil") is the primary liquid constituent of a lubricant, into which additives and possibly other oils are blended, for example to produce a final lubricant (or lubricant composition). A base oil, which is useful for making additive concentrates as well as for making lubricating oil compositions therefrom, may be selected from natural oils (vegetable, animal or mineral) and synthetic lubricating oils and mixtures thereof.

Definitions for the base stocks and base oils in this invention are the same as those found in the American Petroleum Institute (API) publication "Engine Oil Licensing and Certification System", Industry Services Department, Fourteenth Edition, December 1996, Addendum 1, December 1998, which categorizes base stocks as follows:

a) Group I base stocks contain less than 90 percent saturates and/or greater than 0.03 percent sulphur and have a viscosity index greater than or equal to 80 and less than 120 using the test methods specified in Table E-1.

b) Group II base stocks contain greater than or equal to 90 percent saturates and less than or equal to 0.03 percent sulphur and have a viscosity index greater than or equal to 80 and less than 120 using the test methods specified in Table E-1.

c) Group III base stocks contain greater than or equal to 90 percent saturates and less than or equal to 0.03 percent sulphur and have a viscosity index greater than or equal to 120 using the test methods specified in Table E-1.

d) Group IV base stocks are polyalphaolefins (PAO).

e) Group V base stocks include all other base stocks not included in Group I, II, III, or IV.

Typically, the base stock has a viscosity preferably of 3-12, more preferably 4-10, most preferably 4.5-8, mm$^2$/s at 100° C.

TABLE E-1

Analytical Methods for Base Stock

| Property | Test Method |
|---|---|
| Saturates | ASTM D 2007 |
| Viscosity Index | ASTM D 2270 |
| Sulphur | ASTM D 2622 |
|  | ASTM D 4294 |
|  | ASTM D 4927 |
|  | ASTM D 3120 |

Preferably, the oil of lubricating viscosity comprises greater than or equal to 10, more preferably greater than or equal to 20, even more preferably greater than or equal to 25, even more preferably greater than or equal to 30, even more preferably greater than or equal to 40, even more preferably greater than or equal to 45, mass % of a Group II or Group III base stock, based on the total mass of the oil of lubricating viscosity. Even more preferably, the oil of lubricating viscosity comprises greater than 50, preferably greater than or equal to 60, more preferably greater than or equal to 70, even more preferably greater than or equal to 80, even more preferably greater than or equal to 90, mass % of a Group II or Group III base stock, based on the total mass of the oil of lubricating viscosity. Most preferably, the oil of lubricating viscosity consists essentially of a Group II and/or Group III base stock. In some embodiments the oil of lubricating viscosity consists solely of Group II and/or Group III base stock. In the latter case it is acknowledged that additives included in the lubricating oil composition may comprise a carrier oil which is not a Group II or Group III base stock.

Other oils of lubricating viscosity that may be included in the lubricating oil composition are detailed as follows:

Natural oils include animal and vegetable oils (e.g. castor and lard oil), liquid petroleum oils and hydro refined, solvent-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils such as polymerized and interpolymerized olefins (e.g. polybutylenes, polypropylenes, propylene-isobutylene copolymers, chlorinated polybutylenes, poly(1-hexenes), poly(1-octenes), poly(1-decenes)); alkylbenzenes (e.g. dodecylbenzenes, tetradecylbenzenes, dinonylbenzenes, di(2-ethylhexyl)benzenes); polyphenols (e.g. biphenyls, terphenyls, alkylated polyphenols); and alkylated diphenyl ethers and alkylated diphenyl sulfides and the derivatives, analogues and homologues thereof.

Another suitable class of synthetic lubricating oil comprises the esters of dicarboxylic acids (e.g. phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g. butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols, and polyol ethers such as neopentyl glycol, trimethylolpropane, pentaerythritol, dipentaerythritol and tripentaerythritol.

Unrefined, refined and re-refined oils can be used in the compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be unrefined oil. Refined oils are similar to the unrefined oils except they have to been further treated in one or more purification steps to improve one or more properties. Many such purification techniques, such as distillation, solvent extraction, acid or base extraction, filtration and percolation, are known to those skilled in the art. Re-refined oils are obtained by processes similar to those used to obtain refined oils applied to refined oils that have been already used in service. Such re-refined oils are also known as reclaimed or reprocessed oils and often are additionally processed by techniques for treating spent additive and oil breakdown products.

Other examples of base oil are gas-to-liquid ("GTL") base oils, i.e. the base oil may be an oil derived from Fischer-Tropsch synthesised hydrocarbons made from synthesis gas containing $H_2$ and CO using a Fischer-Tropsch catalyst. These hydrocarbons typically require further processing in order to be useful as a base oil. For example, they may, by methods known in the art, be hydroisomerized; hydrocracked and hydroisomerized; dewaxed; or hydroisomerized and dewaxed.

The oil of lubricating viscosity may also comprise a Group I, Group IV or Group V base stocks or base oil blends of the aforementioned base stocks.

The lubricating compositions of the present invention preferably comprise at least 60% by weight, for example 70% by weight or more of an oil of lubricating viscosity, based on the weight of the composition.

Co-Additives

The lubricating oil compositions of all aspects of the present invention may further comprise one or more phosphorus-containing compounds; oxidation inhibitors or antioxidants; dispersants; metal detergents; anti-wear agents; friction modifiers, viscosity modifiers and other co-additives, provided they are different from the oil-soluble poly (2-oxazoline) polymer. These will be discussed in more detail below.

Suitable phosphorus-containing compounds include dihydrocarbyl dithiophosphate metal salts, which are frequently used as antiwear and antioxidant agents. The metal is preferably zinc, but may be an alkali or alkaline earth metal, or aluminum, lead, tin, molybdenum, manganese, nickel or copper. The zinc salts are most commonly used in lubricating oil in amounts of 0.1 to 10, preferably 0.2 to 2 mass %, based upon the total weight of the lubricating oil composition. They may be prepared in accordance with known techniques by first forming a dihydrocarbyl dithiophosphoric acid (DDPA), usually by reaction of one or more alcohol or a phenol with $P_2S_5$, and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides and carbonates are most generally employed. Commercial additives frequently contain an excess of zinc due to the use of an excess of the basic zinc compound in the neutralization reaction.

The preferred zinc dihydrocarbyl dithiophosphates are oil-soluble salts of dihydrocarbyl dithiophosphoric acids and may be represented by the following formula:

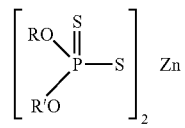

wherein R and R' may be the same or different hydrocarbyl radicals containing from 1 to 18, preferably 2 to 12, carbon atoms and including radicals such as alkyl, alkenyl, aryl, arylalkyl alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e. R and R') in the dithiophosphoric acid will generally be 5 or greater. The zinc dihydrocarbyl dithiophosphate (ZDDP) can therefore comprise zinc dialkyl dithiophosphates. Lubricating oil compositions of the present invention suitably may have a phosphorus content of no greater than about 0.08 mass % (800 ppm). Preferably, in the practice of the present invention, ZDDP is used in an amount close or equal to the maximum amount allowed, preferably in an amount that provides a phosphorus content within 100 ppm of the maximum allowable amount of phosphorus. Thus, lubricating oil compositions useful in the practice of the present invention preferably contain ZDDP or other zinc-phosphorus compounds, in an amount introducing from 0.01 to 0.08 mass % of phosphorus, such as from 0.04 to 0.08 mass % of phosphorus, preferably, from 0.05 to 0.08 mass % of phosphorus, based on the total mass of the lubricating oil composition.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons or esters, phosphorous esters, metal thiocarbamates, oil soluble copper compounds as described in U.S. Pat. No. 4,867,890, and molybdenum-containing compounds.

Aromatic amines having at least two aromatic groups attached directly to the nitrogen constitute another class of compounds that is frequently used for antioxidancy. Typical oil-soluble aromatic amines having at least two aromatic groups attached directly to one amine nitrogen contain from 6 to 16 carbon atoms. The amines may contain more than two aromatic groups. Compounds having a total of at least three aromatic groups in which two aromatic groups are linked by a covalent bond or by an atom or group (e.g., an oxygen or sulfur atom, or a —CO—, —SO$_2$— or alkylene group) and two are directly attached to one amine nitrogen are also considered aromatic amines having at least two aromatic groups attached directly to the nitrogen. The aromatic rings are typically substituted by one or more substituents selected from alkyl, cycloalkyl, alkoxy, aryloxy, acyl, acylamino, hydroxy, and nitro groups. The amount of any such oil soluble aromatic amines having at least two aromatic groups attached directly to one amine nitrogen should preferably not exceed 0.4 mass %.

A dispersant is an additive whose primary function is to hold solid and liquid contaminations in suspension, thereby passivating them and reducing engine deposits at the same time as reducing sludge depositions. For example, a dispersant maintains in suspension oil-insoluble substances that result from oxidation during use of the lubricant, thus preventing sludge flocculation and precipitation or deposition on metal parts of the engine.

Dispersants in this invention are preferably "ashless", as mentioned above, being non-metallic organic materials that form substantially no ash on combustion, in contrast to metal-containing and hence ash-forming materials. They comprise a long hydrocarbon chain with a polar head, the polarity being derived from inclusion of e.g. an O, P, or N atom. The hydrocarbon is an oleophilic group that confers oil-solubility, having, for example 40 to 500 carbon atoms. Thus, ashless dispersants may comprise an oil-soluble polymeric backbone.

A preferred class of olefin polymers is constituted by polybutenes, specifically polyisobutenes (PIB) or poly-n-butenes, such as may be prepared by polymerization of a $C_4$ refinery stream.

Dispersants include, for example, derivatives of long chain hydrocarbon-substituted carboxylic acids, examples being derivatives of high molecular weight hydrocarbyl-substituted succinic acid. A noteworthy group of dispersants is constituted by hydrocarbon-substituted succinimides, made, for example, by reacting the above acids (or derivatives) with a nitrogen-containing compound, advantageously a polyalkylene polyamine, such as a polyethylene polyamine. Particularly preferred are the reaction products of polyalkylene polyamines with alkenyl succinic anhydrides, such as described in U.S. Pat. Nos. 3,202,678; 3,154,560; 3,172,892; 3,024,195; 3,024,237, 3,219,666; and 3,216,936, that may be post-treated to improve their properties, such as borated (as described in U.S. Pat. Nos. 3,087,936 and 3,254,025), fluorinated or oxylated. For example, boration may be accomplished by treating an acyl nitrogen-containing dispersant with a boron compound selected from boron oxide, boron halides, boron acids and esters of boron acids.

Preferably, the dispersant, if present, is a succinimide-dispersant derived from a polyisobutene of number average molecular weight in the range of 1000 to 3000, preferably 1500 to 2500, and of moderate functionality. The succinimide is preferably derived from highly reactive polyisobutene.

Another example of dispersant type that may be used is a linked aromatic compound such as described in EP-A-2 090 642.

A detergent is an additive that reduces formation of piston deposits, for example high-temperature varnish and lacquer deposits in engines; it normally has acid-neutralising properties and is capable of keeping finely-divided solids in suspension. Most detergents are based on metal "soaps", that is metal salts of acidic organic compounds.

Detergents generally comprise a polar head with a long hydrophobic tail, the polar head comprising the metal salt of the acidic organic compound. The salts may contain a substantially stoichiometric amount of the metal when they are usually described as normal or neutral salts and would typically have a total base number or TBN at 100% active mass (as may be measured by ASTM D2896) of front 0 to 80. Large amounts of a metal base can be included by reaction of an excess of a metal compound, such as an oxide or hydroxide, with an acidic gas such as carbon dioxide.

The resulting overbased detergent comprises neutralised detergent as an outer layer of a metal base (e.g. carbonate) micelle. Such overbased detergents may have a TBN at 100% active mass of 150 or greater, and typically of from 200 to 500 or more.

Suitably, detergents that may be used include oil-soluble neutral and overbased sulfonates, phenates, sulfurised phenates, thiophosphonates, salicylates and naphthenates and other oil-soluble carboxylates of a metal, particularly alkali metal or alkaline earth metals, e.g. Na, K, Li, Ca and Mg. The most commonly-used metals are Ca and Mg, which may both be present in detergents used in lubricating compositions, and mixtures of Ca and/or Mg with Na. Detergents may be used in various combinations.

Additional additives may be incorporated into the compositions of the invention to enable particular performance requirements to be met. Examples of such additives which may be included in the lubricating oil compositions of the present invention are metal rust inhibitors, viscosity index improvers, corrosion inhibitors, oxidation inhibitors, other friction modifiers, anti-foaming agents, anti-wear agents and pour point depressants. Some are discussed in further detail below.

Friction modifiers and fuel economy agents that are compatible with the other ingredients of the final oil may also be included. Examples of such materials include glyceryl monoesters of higher fatty acids, for example, glyceryl mono-oleate; esters of long chain polycarboxylic acids with diols, for example, the butane diol ester of a dimerized unsaturated fatty acid; and alkoxylated alkyl-substituted mono-amines, diamines and alkyl ether amines, for example, ethoxylated tallow amine and ethoxylated tallow ether amine.

Other known friction modifiers comprise oil-soluble organo-molybdenum compounds. Such organo-molybdenum friction modifiers also provide antioxidant and antiwear credits to a lubricating oil composition. Examples of such oil-soluble organo-molybdenum compounds include dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alkylthioxanthates.

Additionally, the molybdenum compound may be an acidic molybdenum compound. These compounds will react with a basic nitrogen compound as measured by ASTM test D-664 or D-2896 titration procedure and are typically hexavalent. Included are molybdic acid, ammonium molybdate, sodium molybdate, potassium molybdate, and other alkali metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds.

Among the molybdenum compounds useful in the compositions of this invention are organo-molybdenum compounds of the formula

and

wherein R" is an organo group selected from the group consisting of alkyl, aryl, aralkyl and alkoxyalkyl, generally of from 1 to 30 carbon atoms, and preferably 2 to 12 carbon atoms, and most preferably alkyl of 2 to 12 carbon atoms. Especially preferred are the dialkyldithiocarbamates of molybdenum.

Another group of organo-molybdenum compounds useful in the lubricating compositions of this invention are trinuclear molybdenum compounds, especially those of the formula $Mo_3S_kL_nQ_z$ and mixtures thereof wherein the L are independently selected ligands having organo groups with a sufficient number of carbon atoms to render the compound soluble or dispersible in the oil, n is from 1 to 4, k varies from 4 to 7, Q is selected from the group of neutral electron donating compounds such as water, amines, alcohols, phosphines, and ethers, and z ranges from 0 to 5 and includes non-stoichiometric values. At least 21 carbon atoms should be present among all the ligand organo groups, such as at least 25, at least 30, or at least 35, carbon atoms.

Lubricating oil compositions useful in all aspects of the present invention preferably contain at least 10 ppm, at least 30 ppm, at least 40 ppm and more preferably at least 50 ppm molybdenum. Suitably, lubricating oil compositions useful in all aspects of the present invention contain no more than 1000 ppm, no more than 750 ppm or no more than 500 ppm of molybdenum. Lubricating oil compositions useful in all aspects of the present invention preferably contain from 10 to 1000, such as 30 to 750 or 40 to 500, ppm of molybdenum (measured as atoms of molybdenum).

The viscosity index of the base stock is increased, or improved, by incorporating therein certain polymeric materials that function as viscosity modifiers (VM) or viscosity index improvers (VII). Generally, polymeric materials useful as viscosity modifiers are those having number average molecular weights (Mn) of from 5,000 to 250,000, preferably from 15,000 to 200,000, more preferably from 20,000 to 150,000. These viscosity modifiers can be grafted with grafting materials such as, for example, maleic anhydride, and the grafted material can be reacted with, for example, amines, amides, nitrogen-containing heterocyclic compounds or alcohol, to form multifunctional viscosity modifiers (dispersant-viscosity modifiers).

Polymers prepared with diolefins will contain ethylenic unsaturation, and such polymers are preferably hydrogenated. When the polymer is hydrogenated, the hydrogenation may be accomplished using any of the techniques known in the prior art. For example, the hydrogenation may be accomplished such that both ethylenic and aromatic unsaturation is converted (saturated) using methods such as those taught, for example, in U.S. Pat. Nos. 3,113,986 and 3,700,633 or the hydrogenation may be accomplished selectively such that a significant portion of the ethylenic unsaturation is converted while little or no aromatic unsaturation is converted as taught, for example, in U.S. Pat. Nos. 3,634,595; 3,670,054; 3,700,633 and Re 27,145. Any of these methods can also be used to hydrogenate polymers containing only ethylenic unsaturation and which are free of aromatic unsaturation.

Pour point depressants (PPD), otherwise known as lube oil flow improvers (LOFIs) lower the lowest temperature at which the lube flows. Compared to VM, LOFIs generally have a lower number average molecular weight. Like VM, LOFIs can be grafted with grafting materials such as, for example, maleic anhydride, and the grafted material can be reacted with, for example, amines, amides, nitrogen-containing heterocyclic compounds or alcohol, to form multifunctional additives.

In the present invention it may be necessary to include an additive which maintains the stability of the viscosity of the blend. Thus, although polar group-containing additives achieve a suitably low viscosity in the pre-blending stage, it has been observed that some compositions increase in viscosity when stored for prolonged periods. Additives which are effective in controlling this viscosity increase include the long chain hydrocarbons functionalized by reaction with mono- or dicarboxylic acids or anhydrides which are used in the preparation of the ashless dispersants as hereinbefore disclosed.

When lubricating compositions contain one or more of the above-mentioned additives, each additive is typically blended into the base oil in an amount that enables the additive to provide its desired function. Representative effective amounts of such additives, when used in crankcase lubricants, are listed below. All the values listed (with the exception of detergent values since the detergents are used in the form of colloidal dispersants in an oil) are stated as mass percent active ingredient (A.I.).

| ADDITIVE | MASS % (Broad) | MASS % (Preferred) |
|---|---|---|
| Dispersant | 0.1-20 | 1-8 |
| Metal Detergents | 0.1-15 | 0.2-9 |
| Corrosion Inhibitor | 0-5 | 0-1.5 |
| Metal dihydrocarbyl dithiophosphate | 0.1-6 | 0.1-4 |
| Antioxidant | 0-5 | 0.01-2.5 |
| Pour Point Depressant | 0.01-5 | 0.01-1.5 |
| Antifoaming Agent | 0-5 | 0.001-0.15 |
| Supplemental Antiwear Agents | 0-1.0 | 0-0.5 |
| Friction Modifier | 0-5 | 0-1.5 |
| Viscosity Modifier | 0.01-10 | 0.25-3 |
| Base stock | Balance | Balance |

Preferably, the Noack volatility of the fully formulated lubricating oil composition (oil of lubricating viscosity plus all additives) is no greater than 18, such as no greater than 14, preferably no greater than 10, mass %. Lubricating oil compositions useful in the practice of the present invention may have an overall sulfated ash content of from 0.5 to 2.0, such as from 0.7 to 1.4, preferably from 0.6 to 1.2, mass %.

It may be desirable, although not essential, to prepare one or more additive concentrates comprising additives (concentrates sometimes being referred to as additive packages) whereby several additives can be added simultaneously to the oil to form the lubricating oil composition.

Examples

The invention will now be particularly described in the following non-limiting examples.

The homopolymer structure was

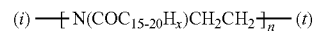

where (i)=Me and (t)=tosylate. Each of the groups $R^1$ carries the number of hydrogen atoms 'x' appropriate to the carbon chain-length of each substituent.

Synthesis of Polymers

Rapeseed fatty-acid derived 2-oxazoline (FAOx$^5$) (n eq.), the fatty acid having greater than 40% of molecules having unsaturated $C_{16}$ to $C_{18}$ groups (corresponding to greater than 40% of groups $R^1$ in the resulting polymer being unsaturated and having 15 to 17 carbon atoms); and methyl tosylate (1.00 eq.) were heated at 100° C. for 1 h, then the temperature was raised to 120° C. and it was stirred until NMR showed quantitative conversion of the starting material (1 to 3 h). The yellow solid was used as obtained without any further purification.

Four polymers of different molecular weight were prepared, characterised as follows.

| Polymer example | amount of FAOx$^5$ | amount of MeOTS | n | $M_n$.$^a$ $_{GPC}$ | Đ |
|---|---|---|---|---|---|
| P1 | 5.66 g, 18.5 mmol | 86.1 mg, 462 μmol | 28 | 9000 | 2.00 |
| P2 | 4.45 g, 14.5 mmol | 44.4 mg, 242 μmol | 37 | 12 000 | 3.27 |
| P3 | 4.45 g, 14.5 mmol | 33.9 mg, 182 μmol | 46 | 15 000 | 3.21 |
| P4 | 3.90 g, 12.7 mmol | 23.7 mg, 127 μmol | 93 | 30 000 | 1.73 |

$^a$Gel permeation chromatography (GPC) measurements were conducted on an Agilent 1260 infinity system operating in DMF with 5 mM NH$_4$BF$_4$ and equipped with refractive index detector and variable wavelength detector, 2 PLgel 5 μM mixed-C columns (300 × 7.5 mm), a PLgel 5 mm guard column (50 × 7.5 mm) and an autosampler. The instrument was calibrated with linear narrow poly(methyl methacrylate) standards in range of 550 to 6003000 g/mol. All samples were filtered with a 0.2 μm Nylon 66 filter before analysis.

Tests

Each of the above polymers was tested when dispersed in an API Group I base oil (SN150FAW) at 0.91 wt % concentration in one or more of the following tests.

Friction Coefficient: MTM (mini traction machine), supplied by PCS Instruments

The test profile consisted of nine steps, alternating traction and Stribeck curves, over a range of temperatures:

| Step No. | Step type | Temperature (° C.) |
|---|---|---|
| 1 | Traction | 40 |
| 2 | Traction | 60 |
| 3 | Stribeck | 60 |
| 4 | Traction | 80 |
| 5 | Stribeck | 80 |
| 6 | Traction | 100 |
| 7 | Stribeck | 100 |
| 8 | Traction | 135 |
| 9 | Stribeck | 135 |

The test parameters were as follows:

| Parameter description (units) | Value |
|---|---|
| Load (N) | 30 |
| Stribeck step speed range (mm/s) | 2000-20 |
| Stribeck step Slide-toRoll ratio (%) | 50 |
| Traction step SRR range (%) | 0-60 |
| Traction step rolling speed (mm/s) | 1000 |
| Test duration (min) | 52 |
| Disc track radius (mm) | 21.05 |
| Specimen steel grade | AISI 52100 |
| Ball diameter (mm) | 19 |
| Disc diameter (mm) | 46 |

Two or three independent repeats were carried out in a randomised trial and the results were averaged.

Viscometric Determination

Polymer concentration for viscometric determinations=1 wt % in the same API Group I base oil (SN150FAW) as used above.

HTHS (high temperature high shear) viscosity at 150° C.-CEC-L-36-90

Results

| Example | HTHS | Average Friction Coefficient$^a$ |
|---|---|---|
| Comp. 1$^b$ | 2.62 | 0.043 |
| P1 (MHI447-2) | 1.89 | 0.050 |
| P2 (MHI454-I) | Not tested | 0.050 |
| P3 (MHI454-I) | Not tested | 0.059 |
| P4 (MHI455) | 1.94 | 0.062 |
| Base Oil | 1.80 | 0.081 |

$^a$Average Friction Coefficient is calculated in the region of the Stribeck Curve from a mean rolling speed of 20.01 mms$^{-1}$
$^b$Comp. 1 is a comparative test using a commercially-available olefin co-polymer dispersant viscosity modifier HiTec 5777.

The results show that the examples of the invention (P1-P4) exhibited friction benefits compared with the base oil tests when the poly(2-oxazolines) was absent; that their friction performance were comparable with that of the commercial additive; and, significantly, that their HTHS viscosities were lower than that of the commercial additive at the given polymer treat rate.

Solubility Testing

| Example | Soluble @ 25° C.$^a$ | Soluble @ 70° C.$^a$ | Soluble @ 100° C.$^a$ |
|---|---|---|---|
| P1 | Yes | Yes | Yes |

$^a$Solubility determined by visually expecting a solution containing 2.5 wt % of the material in a Group III base stock (Yubase 4).

The results show that an example of the invention (PI) was soluble in the base oil at temperatures representative of those experienced by lubricating oils when in service.

What is claimed is:

1. A lubricating composition for the lubricating the crankcase of spark-ignited or compression-ignited internal combustion engines comprising a major amount of an oil of lubricating viscosity and 0.01 to 25 percent by weight, based on the weight of the composition, of a poly(2-oxazoline) polymer having the repeat unit:

—N(COR$^1$)CH$_2$CH$_2$— wherein each $R^1$ is independently selected from $C_1$ to $C_{50}$ hydrocarbyl; and the number of repeat units (n) in the polymer is an integer between 4 and 1000;

wherein the polymer carries an inorganic or organic nucleophilic polymerisation terminating group (t), and an initiator group (i) connected to the N atom of a repeat unit, the initiator group (i) being effective to initiate the polymerisation of linear, branched or cyclic hydrocarbyl moieties; and wherein at least 5% of the total number of the groups $R^1$ in the polymer comprise alkenyl groups having between 15 and 20 carbon atoms; and wherein said lubricating oil composition further comprises minor amounts of at least one additive selected from dispersants, metal detergents and anti-wear agents.

2. A lubricating composition according to claim 1 wherein at least 20% of the total number of the groups $R^1$ in the polymer comprise alkenyl groups having between 15 and 20 carbon atoms.

3. A lubricating composition according to claim 1 wherein at least 5% of the total number of the groups $R^1$ in the polymer comprise alkenyl groups having 17 carbon atoms.

4. A lubricating composition according to claim 1 wherein groups $R^1$ comprise a mixture of singly, doubly and triply-unsaturated $C_{17}$ alkenyl groups which mixture predominates in singly and doubly-unsaturated $C_{17}$ alkenyl groups.

5. A lubricating composition according claim 1 wherein groups $R^1$ are obtained from natural fatty acids.

6. A lubricating composition according to claim 1 wherein n is between 4 and 400.

7. A lubricating composition according to claim 6 wherein n is between 10 and 300.

8. A lubricating composition according to claim 1 wherein the polymer is a copolymer.

9. A lubricating composition according to claim 1 wherein the polymer has a star architecture with three or more arms, and a molecular weight of 5,000-500,000 g/mol, as measured by Gel Permeation Chromatography with reference to linear narrow poly(methylmethacrylate) standards in the range of 550 to 600,000 g/mol.

10. A lubricating composition according to claim 1 comprising one or more co-additives, different from the oil-soluble poly(2-oxazoline) polymer, selected from one or more phosphorus-containing compounds; oxidation inhibitors or anti-oxidants; friction modifiers and viscosity modifiers.

11. A lubricating composition according to claim 1 comprising at least 60% by weight of an oil of lubricating viscosity.

12. A method of lubricating the crankcase of an internal combustion engine comprising operating the engine and lubricating the crankcase with a lubricating oil composition of claim 1.

* * * * *